April 8, 1941. W. F. ZIMMERMANN 2,237,465
CHANGE GEAR RETAINING LOCK
Filed March 9, 1939
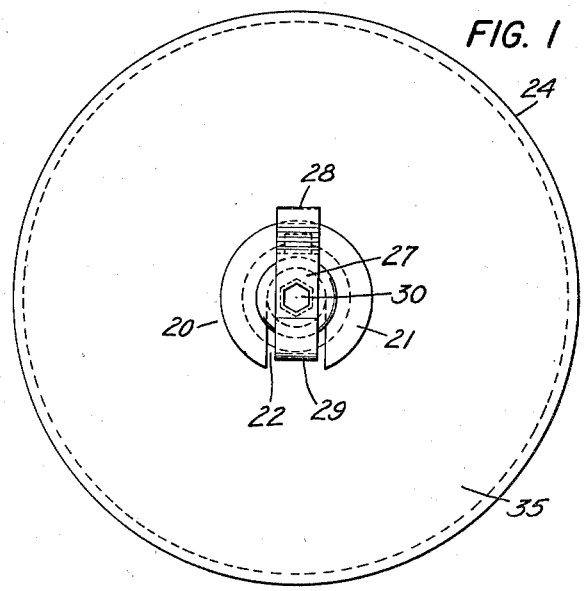
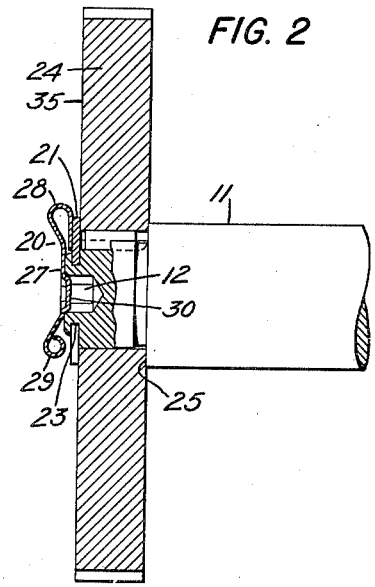
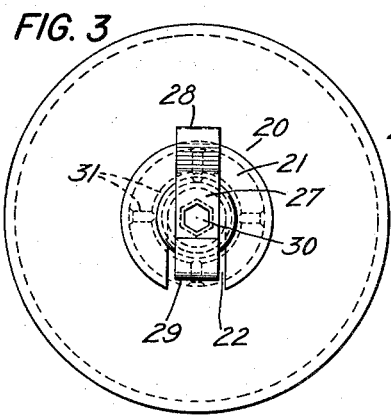
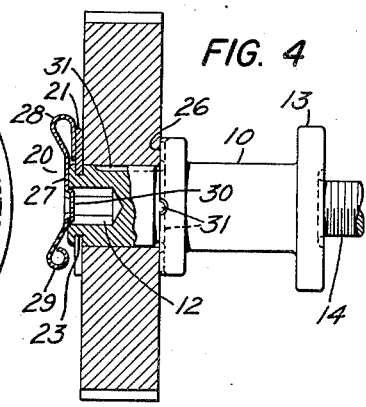
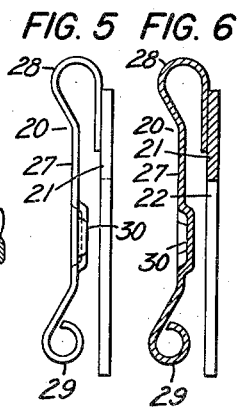
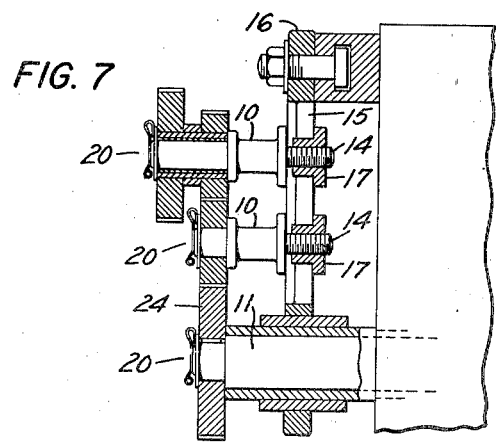
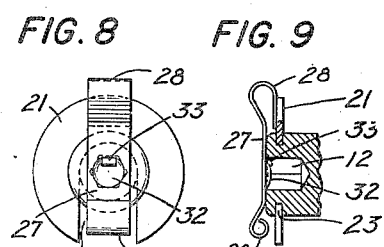
INVENTOR
William F. Zimmermann
BY
Albert F. Nathan
ATTORNEY Patented Apr. 8, 1941

2,237,465

UNITED STATES PATENT OFFICE 2,237,465

CHANGE GEAR RETAINING LOCK

William F. Zimmermann, Maplewood, N. J., assignor to Gould & Eberhardt, Newark, N. J., a corporation of New Jersey Application March 9, 1939, Serial No. 260,734

2 Claims. (Cl. 287—53)

The present invention concerns an improvement in pick-off change-gear locking devices and more particularly to an improved form of key or locking member for holding the gear against axial movement on its shaft.

Prior to the present invention it was customary to lock the change-gear to its shaft by means of a nut and washer that had to be removed completely before the gear could be withdrawn from the shaft. In some installations, a flat split washer was employed, but this meant that the shaft end and nut had to be much smaller than the hole in the gear to allow removal of the gear over the retaining nut. In either case, certain practical difficulties were experienced in their manipulation, one of which was that because of the number of small parts and general shape, they frequently were dropped and became lost about the machine or in the oil pans that usually underlie change-gear mechanisms.

Another method of locking heretofore resorted to, comprised a washer and cotter pin that required special tools for applying and removing, or a split washer which straddled the shaft and had a portion thereof bent over and hammered down against the shaft. Such practices as these, however, were unsatisfactory not only because they required special tools for applying and removing but consisted of numerous small parts easily dropped and lost. Moreover, as in the more modern change-gear mechanisms, the gears and shafting are more closely compacted and the gears arranged in overlapping relation with one another. In such compact quarters, wrenches or various other hand tools could not conveniently be used to remove the conventional locking devices.

The aim of the present invention is to eliminate the necessity for a kit of special tools every time a gear is to be changed and to render available a gear lock for change-gear transmissions that will efficiently retain the gears in position and which will be self-locking so as not to be flung off on reversing yet, be conveniently operable for hand removal at all times. And as a further refinement to provide a gear lock that lends itself readily adaptable to the locking of gears on rotating shaft ends as well as to the locking of gears on stationary stud shafts which usually are arranged on plates or guides to provide a range of shifting center distances.

When the pick-off gears in a transmission are mounted upon stationary shafts, the angular movement of the gears impose a drag upon the retainers and causes them to turn angularly and eventually to cut off the ends of the shafts. Moreover, in reversing transmissions, the sudden change in direction of motion has a tendency to dislodge ordinary retainers and in some instances they have been flung off, thus freeing the gear. A further aim of this invention is to guard against the wearing away of shaft ends and the accidental freeing of gears by rendering available a retainer that automatically is self-locking and inherently resistant to both radial and angular movements relative to the shaft on which it is mounted.

In attaining the aims of this invention it is proposed to form the shaft ends, and stud ends of the transmission, with a central cavity, and to circumscribe the cavity, on the periphery of the shaft, with a narrow groove adjacent the outer end thereof. In the case of the stationary stud shaft the central cavity may be square or hexagonal, but with a driving or driven shaft it may be merely round. The gear retaining device cooperates with groove and cavity in the shaft or stud, and comprises a bifurcated disc, that substantially fills the annular groove in the end of the shaft. The disc is provided with a spring detent portion (which also provides a hand grasp), that is spring pressed over the end of the shaft into cooperative relation with the central cavity therein. A part of the end-overlying portion of the retainer extends beyond the center of the shaft approximately to the periphery of the disc, at which point it is bent back upon itself (away from the shaft end) and then curled forward (toward the shaft) to afford a combined hand grasp portion and cam for facilitating the mounting or removal of the locking disc from a shaft. The radially opposite portion of the overlying tongue is also provided with a looped portion, raised or displaced a substantial distance away from the general plane of the disc to provide a hand grasp accessible from that side, and additionally, for the purpose of rendering the lock adaptable to shafts in which there may be differences in the spacing of the annular groove from the end thereof.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, a drawing depicting a preferred typical construction has been annexed as a part of this disclosure and, in such drawing, like characters of reference denote corresponding parts throughout all the views, of which—

Figs. 1 and 2 are end and side views of a gear keyed to a driving shaft illustrating the present gear lock in operative position.

Figs. 3 and 4 are similar views of a stud shaft showing an idler gear retained thereon.

Figs. 5 and 6 are side views, in elevation and section, illustrating the preferred design of retainer.

Fig. 7 is a sectional view of a change-gear mechanism, showing my new design of retainer in a typical environment.

Figs. 8 and 9 are views of a modified form of retainer.

Referring more particularly to Figs. 2, 4, and 7, the ends of the studs 10 and shafts 11 therein disclosed, are provided with central cavities 12. In the case of the studs, the cavity is preferably square or hexagonal for purposes later to be explained. The inner end of the stud is flanged, as at 13, and reduced as at 14, to pass through a slot 15 in the supporting bracket 16. A T head form of nut 17 is threaded to the stud and is held from turning by the walls of the slot in the supporting bracket.

An important feature of the central cavity in the ends of the shaft or stud, is its cooperative function with the gear retaining disc member 20. As more clearly illustrated in Figs. 1, 5 and 6, the retainer disc comprises a gear engaging plate 21, having a slot 22 extending radially thereof.

Near the end of the shaft or stud, an annular groove 23 is formed of a width snugly to receive the slotted plate 21, and to hold the latter flat against the gear 24 that may be mounted on the shaft. The opposite side of the gear abuts against a shoulder 25 or 26 respectively on the shaft 11 or the stud 10. The gear retaining disc straddles the shaft and normally is disposed concentric therewith as illustrated in Figs. 1 and 3.

The retaining disc 21 is provided with a relatively narrow strip or tongue portion 27 that is bent back upon itself so as to lie substantially parallel to the plane of the disc but spaced therefrom. This strip is formed so as to provide a relatively large loop 28, displaced away from the plane of the disc, at the folded end. The strip also extends completely across the center of the disc and is raised at its free end further from its general plane and then curled back (toward the disc) to provide a rolled end 29. Approximately at the geometric center of the retainer, the strip 27 is depressed, at 30, in a direction toward the disc 21, to provide a hexagonal detent.

The size of the detent and its location is such that it coincides with the center of the shaft on which it is placed, and coincides with the size of the cavity 12 therein so as to lock the retainer against untoward movement laterally such as would permit a portion of the disc 21 to disengage itself from the slot in the shaft and weaken the lock. The looped free end of the tongue portion does not engage the end of the shaft, such engagement that the tongue has with the shaft, is made only with respect to the end face thereof and the medial portions of the tongue.

In the case of a shaft on which the pick-off gear is to run loose as, for example, in the arrangement represented by Fig. 4, the facets of the hexagonal shaped detent interfit with the flats of the hexagonal recess in the shaft and effectively lock the retainer against angular movement as well as radial movement. In this way undue wear in the groove 23 is prevented and the possibility of retainers being flung off on reversing, is avoided.

The recessed end of a normally stationary stud shaft also facilitates the making of adjustments for gear sizes. By using a simple wrench shaped to fit the square or hexagonal recess, the stud may conveniently be clamped and unclamped from its support from the front or open side of the transmission casing and without reaching behind the gear or gears that may be journaled thereon. Lubricating material for such a mounting is afforded by providing radial and axial oil grooves 31 which feed the lubricant to the bearing surfaces.

In operation the user will place the gear selected upon the shaft and with a simple movement of his hand, engage the bifurcated ends of the retaining disc in the groove in the shaft and give it a slight push across its axis until the detent 30 snaps into the cavity 12 provided at the end of the shaft. In the case of a large flat gear such as indicated in Figs. 1 and 2, the present invention greatly simplifies the operation for the reason that the relatively large looped ends 28 and 29 which extend away from the face 35 of the gear, provide the user with a hand grasp portion by means of which he may readily and conveniently hold the retainer while applying it to a shaft in the closest of quarters. Similarly upon removal, all the operator need to do is to give a pull on the looped end 28, or a gentle push on the looped end 29, and the detent 30 releases itself from the cavity in the end of the shaft. Throughout the operation the operator has at all stages something substantial to take hold of, which is of considerable importance when working against a large flat surface of a gear and in confined and restricted places.

No tools of any nature or description are required to apply or remove the locking device of the present invention, and in actual practice it has been found to overcome numerous inherent disadvantages of prior constructions and their attendant difficulties, and satisfactorily and efficiently to perform its intended function of locking a gear to a shaft end.

Fig. 7 further illustrates a compound gear mounted upon an adjustable stud, and the foregoing considerations apply thereto. This figure also is representative of a condition frequently encountered in change speed transmissions where one or more of the change gears overlap partially, if not entirely, other gears or shafts so as to make the hidden gears and studs almost inaccessible. In the prior devices it was necessary to first remove the outer gears, then make such changes as were necessary to the inner ones and then replace the outer gears. With the present invention most, if not all, of this troublesome operation has been eliminated by the provision of an entirely manually operable retainer with its cooperating relation with a cavity in the endface of the stud or shaft, which is itself, a feature of the conveniently accessible means for locating and clamping the stud to its supporting bracket thereby properly to relate the gear applied thereon to its other component elements of the transmission.

Figs. 8 and 9 illustrate a modified form of retainer which is also self-locking angularly as well as radially. In this instance the central detent 32 is substantially hemispherical and has one or more sections 33 punched out and flattened to provide facets approximately the width of the flat sides of the cavity in the shaft. Preferably the punched out section is struck from the hemisphere to that side of the axis nearest the connecting loop 28. When so located, the depressed tongue locks the retainer against movement in the direction in which it would free itself from the shaft and simultaneously affords a beveled surface facilitating hand removal. When in use, the facet 33 enters the cavity in the shaft and engages with the flats thereof and thereby locks the retainer against rotation. In the case of rotating shafts, as to which the locking against angular movement is not essential as all parts turn together, the tongue 33 enters the cavity in the shaft whether the cavity be circular or angular and locks the retainer against radial movement.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A member for retaining a pick-off gear on the end of a shaft comprising a radially slotted disc adapted to fit a groove adjacent the end of the shaft and to straddle the shaft, said shaft also having a polygonal cavity formed axially in the end thereof, said disc having a portion overlying the slot and spaced from the general plane of the disc and provided at its geometric center with detent means for cooperating with at least one of the facets of the polygonal cavity in the shaft thereby resiliently to lock the slotted disc against radial and angular movement relative to the shaft.

2. A gear retainer comprising a flat plate having a slot extending inward from one edge adapted to straddle a groove in a shaft end, which shaft has an axially extending polygonal opening in the end thereof, a strip member secured to a marginal portion of and extending diametrically across the said plate in generally parallel spaced relation to the plane thereof, said strip having detent means axially in alignment with the polygonal opening in said shaft adapted to enter said shaft opening and to engage with at least one of the flat walls thereof and to interlock therewith whereby said retainer is constrained against radial and angular movement relative to the shaft, said strip member also having its free end bent away from the general plane of the strip and curved upon itself to form a handgrasp portion, and also having that portion thereof in the region of the union of the strip member with the plate formed in a relatively large loop, a large part of which lies to the side of said strip away from the plate thereby affording a second handgrasp portion.

WILLIAM F. ZIMMERMANN.